(12) United States Patent
De Groot et al.

(10) Patent No.: US 11,229,185 B2
(45) Date of Patent: Jan. 25, 2022

(54) MILKING SYSTEM COMPRISING A MILKING CUP WITH A SENSOR AND A POWER SUPPLY

(71) Applicant: LELY PATENT N.V., Maassluis (NL)

(72) Inventors: Pieter Gerlof De Groot, Maassluis (NL); Rik Steenbergen, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 229 days.

(21) Appl. No.: 16/346,206

(22) PCT Filed: Oct. 24, 2017

(86) PCT No.: PCT/NL2017/050693
§ 371 (c)(1),
(2) Date: Apr. 30, 2019

(87) PCT Pub. No.: WO2018/084698
PCT Pub. Date: May 11, 2018

(65) Prior Publication Data
US 2020/0053973 A1     Feb. 20, 2020

(30) Foreign Application Priority Data

Nov. 7, 2016  (NL) ...................................... 2017728

(51) Int. Cl.
| | | |
|---|---|---|
| *A01J 5/007* | (2006.01) | |
| *A01K 1/12* | (2006.01) | |
| *A01J 5/01* | (2006.01) | |

(52) U.S. Cl.
CPC .................. *A01J 5/007* (2013.01); *A01J 5/01* (2013.01); *A01K 1/12* (2013.01)

(58) Field of Classification Search
CPC ............... A01J 5/007; A01J 5/01; A01K 1/12
See application file for complete search history.

(56) References Cited

U.S. PATENT DOCUMENTS

| | | | |
|---|---|---|---|
| 6,598,560 B1 * | 7/2003 | van den Berg | A01J 5/007 119/14.08 |
| 2009/0165724 A1 | 7/2009 | Mader et al. | |
| 2009/0201159 A1 | 8/2009 | Kaever et al. | |

FOREIGN PATENT DOCUMENTS

| | | | | |
|---|---|---|---|---|
| DE | 201 12 052 U1 | | 2/2003 | |
| GB | 2079956 A | * | 1/1982 | ................ A01J 5/01 |

OTHER PUBLICATIONS

International Search Report dated Jan. 22, 2018 in PCT/NL2017/050693 filed Oct. 24, 2017.

* cited by examiner

*Primary Examiner* — Joshua D Hudson
*Assistant Examiner* — Megan J Moroney
(74) *Attorney, Agent, or Firm* — Oblon, McClelland, Maier & Neustadt, L.L.P.

(57) ABSTRACT

A milking system for milking a dairy animal includes a milking cup to be attached to a teat of the dairy animal and milking the milk, and an electronic component. The electronic component includes a sensor which is arranged in or on the milking cup for measuring a value of a variable related to the milking, a transmitter for transmitting the measured values, and a power supply for supplying the sensor and/or the transmitter with electrical energy. The power supply may include an inductive power supply with a first coil component and a second coil component, where the first coil component and the electronic component are electrically connected to each other, and where the second coil component is electrically directly connectable to an external source of electrical energy. The milking system also includes a fastening means which holds the first coil component and the second coil component together.

13 Claims, 3 Drawing Sheets

MILKING SYSTEM COMPRISING A MILKING CUP WITH A SENSOR AND A POWER SUPPLY

Figure 1:
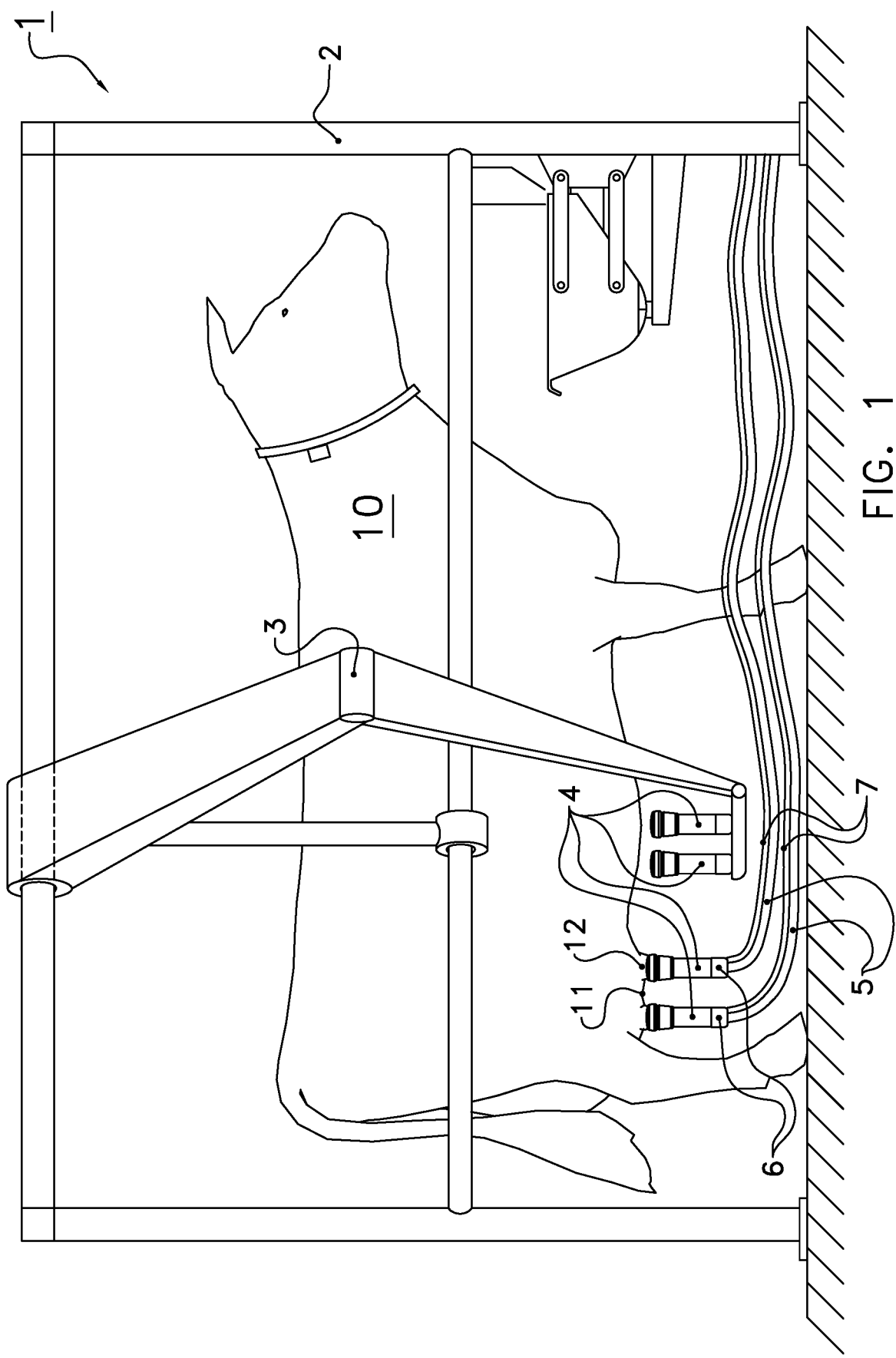

The present invention relates to a milking system for milking a dairy animal.

Such systems comprise a milking cup to be attached to a teat of the dairy animal and milking the milk, and usually a plurality of milking cups, depending on the animal to be milked, such as two milking cups for a goat and four milking cups for a cow.

The milking system furthermore comprises an electronic component with a sensor which is arranged in or on the milking cup for measuring a value of a variable related to the milking, a transmitter for transmitting the measured values and a power supply for supplying the sensor and/or the transmitter with electrical energy. The power supply comprises an inductive power supply with a first coil component and a second coil component.

Such milking systems are known from EP1360894.

A drawback of the known milking system is the fact that its effectiveness is only limited over time, meaning that it is possible that milking takes place, but that no sensor value is being measured and passed on, thus effectively rendering the sensor inactive. Furthermore, the ease of use of conventional milking systems comprising such milking cups is limited.

It is an object of the present invention to at least partly overcome one or more of the abovementioned drawbacks.

This object is achieved according to the invention by a milking system as claimed in claim 1, in particular a milking system for milking a dairy animal, comprising a milking cup to be attached to a teat of the dairy animal and milking the milk, and an electronic component with a sensor which is arranged in or on the milking cup for measuring a value of a variable related to the milking, a transmitter for transmitting the measured values and a power supply for supplying the sensor and/or the transmitter with electrical energy, wherein the power supply comprises an inductive power supply with a first coil component and a second coil component, wherein the first coil component and the electronic component are electrically connected to each other in a direct and fixed manner, and wherein the second coil component is electrically directly connectable to an external source of electrical energy, wherein the milking system furthermore comprises a fastening means which holds the first coil component and the second coil component together, even during milking.

Such an inductive coupling, comprising a first and a second coil which are coupled to each other via their magnetic fields, is assumed to be known. Due to the fact that the first and the second coil component are galvanically isolated, there is less risk of stray currents in the milking cup and to the teat, which are extremely unpleasant for the dairy animal. But due to the fact that, contrary to the prior art, the first and second coil component are also held together by the fastening means during milking, electrical power is available for the electronic component even during milking. A smooth milking operation will take 7 minutes at least and may take more than 10 minutes with cows which are slower at giving milk. If, in addition, attaching the milking cup takes a lot of time, in which case the milking cup may have been removed from a milking cup holder or magazine, or if the milking cup is kicked off during use and has to be reconnected, the total time during which the first and second coil component are separated from each other may amount to as much as 15 minutes in the prior art. With the known milking system, the sensor and/or the transmitter are not provided with electricity for this entire period of time. This requires either a large and heavy energy store, which is undesirable, or accepting that the sensor values will not be available continuously during some of the milking operations, which is likewise undesirable. By contrast, in the case of the present milking system, electrical energy is continuously available, thus greatly increasing reliability.

In addition, it should be noted here that the known milking system is associated with limitations with regard to ease of use. Conventional milking systems, in which the milking cups are connected to the teats of a dairy animal by hand, have milking cups which are provided in the form of a milking claw at each milking stall, with the milk hoses of the milking cups converging in this claw and, from there, continuing as one milk hose to the milk tank. In order to detach the milking cups, in which a milking vacuum prevails, from the ambient pressure after a dairy animal has been milked, the claw is usually suspended with the milking cups pointing downwards, in which case the short milk hoses bend and shut. In this case, it is needlessly laborious, and thus a strain for the milker, to push the first coil component onto the second coil component in order thus to be able to provide the power supply in the milking cup with new energy. This would require a new design of the milking system. According to the present invention, this is entirely superfluous.

Incidentally, the milking system may also comprise a milking robot, comprising a robot arm for attaching the milking cup(s) to the teat(s) of the dairy animal. Just like conventional milking systems, such a milking robot system will additionally comprise other parts, such as a vacuum source, a pulsator, and milk-collecting tank etc., which, however, do not relate directly to the invention and do therefore not have to be discussed in more detail here.

With regard to milking robots, there are more or less two distinguishable design directions, a first in which the milking cups are provided in a magazine and are individually grabbed by the robot arm and attached, and a second in which all milking cups are provided on the robot arm, are taken simultaneously to the udder and are then attached. In the context of the present invention, the advantage will be even greater for the first design direction compared to a possible design according to the known milking system, as the milking cup would in this case already be detached from the second coil component from the moment it is removed from the magazine, and thus also during the entire teat-locating process.

In this context, the expression "electrically connected to each other in a direct and fixed manner" is understood to mean that the respective components have a permanent electrical connection which is intended never to be disconnected nor to be disconnectable without rendering the milking cup useless. The expression "the second coil component is electrically directly connectable to an external source of electrical energy" is understood to mean that either an electrical connector is provided on the second coil component for this connection, so that the milking cup and the second coil component are displaceable and replaceable together, or the second coil component is actually already and remains attached to the external source of electrical energy via the rest of the milking system, in this case the milking robot. The latter relates in particular to the electricity grid, but could also be a generator or PV system.

The fastening means which holds the first coil component and the second coil component together, even during milking, comprises any means which is suitable for the forces occurring during milking, such as screws, bolts, threaded or bayonet connections, magnets, etc.

The electronic component comprises, for example, a sensor for measuring a value of a variable related to the milking. In this case, the sensor may be arranged on the milking cup, such as an accelerometer which is glued or screwed onto the milking cup in order to measure the acceleration of the milking cup during milking. Advantageously, the sensor is arranged in the milking cup and is configured to measure a value of a variable related to the milking, such as a pulsation vacuum. More particularly, the sensor is configured to measure a value of a milk property, such as a milk temperature or conductivity. In this case, it is a significant advantage if the measurement can be performed in as early a stage as possible, namely when exiting the teat into the milking cup. Thus, any measures which may be required can be taken as quickly as possible, such as discharging the milk or changing the settings of the milking system, such as a different milking vacuum.

Said transmitter is configured to transmit measured values. It is also possible for the transmitter to comprise a receiver for receiving data and/or instructions. In particular, the receiver is configured for receiving a starting signal and/or stopping signal for the sensor in order to start and/or stop measuring one or more values. However, other data or signals are not excluded. In addition, it is possible for bidirectional communication to be provided on the transmitter and the receiver.

Important embodiments are described in the dependent claims and in the following part of the description.

An important embodiment of the invention is a milking system wherein the fastening means is detachable by a user in order to replace the second coil component or the milking cup. When using the milking cup, it is possible that the second coil component, or a power lead therefor, becomes damaged. In particular a kick by a cow, but also wear which is normal and results from repeated bending and the like, may lead to such damage. It is then a drawback if the entire milking cup has to be replaced together with a sensor which is often expensive. The significant advantage of this embodiment is that in this case only the second coil component has to be replaced, which can be effected simply by releasing the fastening means, e.g. by unscrewing. Often, construction of the second coil component is much simpler and it can therefore be replaced in a simple and inexpensive manner.

In embodiments, the milking system comprises an external source of electrical energy which is electrically connected to the second coil component by an external current conductor, in particular an electric wire. In this case, as has already been mentioned briefly above, consideration may be given to a generator, such as a PV system, but also to a connection to the mains. The wire or strip or rod, etc. may in this case be connected to the coil of the second coil component by any connector.

In embodiments, the second coil component comprises a housing containing a coil and a connection between the coil and the external current conductor which connection is integrally molded on or cast in. Such a housing can ensure that the coil is protected against influences from the outside, such as corrosion or dirt. Furthermore, the housing provides a solid base for a connection between the coil of the second coil component and the external current conductor, which connection is likewise protected, such as a connection which is integrally molded on or cast in. In particular an embodiment in which the connection/connector and the coil are cast in the second coil component, in for example a synthetic resin or the like, offers a particular resistance to moisture, corrosion and the like.

In embodiments, the transmitter is configured to transmit the measured value via the first coil component, the second coil component and the external current conductor. Here, the value may be a sensor value or a value which has already been processed by a processing unit provided near the sensor. The transmitter is required in order to make the measured and/or processed value(s) available to an external control unit. In this embodiment, the transmitter is configured to send this (these) value(s) via the power connection since this already forms an electrical (signal) path. In particular, the transmitter comprises a modulator in order to provide a voltage signal on the first coil component, which voltage signal is modulated as a function of the measured value. The voltage signal can then be picked up and read out further down the path, e.g. on the side of the second coil component. Such PLC (power line communication) is known per se and for details reference should therefore be made to the respective literature. As has already been described above, it is also possible for the transmitter to also comprise a receiver which is configured for receiving external data or instructions, again in particular via a modulated voltage signal.

In embodiments, the transmitter comprises a wireless transmitter, in particular an NFC device, a Bluetooth or ZigBee device, or an optical transmitter, such as an infrared transmitter/LED. With such optical and/or wireless transmitters, the power supply does not in principle have to result in interference by the power supply, although it may sometimes be desirable to screen off the wireless signal and the magnetic fields and the resulting electromagnetic interference. Furthermore, it is possible to provide other auxiliary devices in order to improve the transmission. For example, a suitable ferrite tape or another element may be provided in order to improve the electromagnetic coupling of transmitter and receiver. There are many options when selecting a wireless transmitter and obviously the associated receiver on the processing side, each with their specific properties, which are, however, outside the scope of the present invention. All remarks in this paragraph in principle also apply in full to receivers which are, on the one hand, external and are, on the other hand, provided in or on the milking cup.

In particular, the sensor comprises a plurality of part sensors, each of which is operatively connected to a receiver or comprises a receiver, in which case the receivers are configured to receive data and/or instructions from or to communicate with one and the same transmitter. Thus, a plurality of receivers are coupled to the same transmitter, which saves space and renders the distribution of sensors over the milking cup and any other parts of the milking system, such as milk hoses and the like, more flexible.

In embodiments, the milking cup comprises an energy store which is configured to be charged by means of the power supply. Even though, according to the invention, it is strictly speaking no longer necessary to provide such an energy supply for the electronic component, it can still offer the advantage of ensuring the power supply of the electronic component should the supply voltage be lost. The energy store comprises, for example, a battery. If, for example, the energy supply from the second coil component is lost during a milking operation, then the energy store is able to provide the energy supply for the electronic component for the remainder of the milking operation. If desired, the electronic component may be adapted to reduce its energy demand and thus switch to "emergency power". Partly for this reason and because the time required for a milking operation is shorter than that required for picking up a milking cup, locating a teat, connecting and milking, the battery may also be smaller than in the prior art.

In particular embodiments, the power supply is furthermore configured to detect if the electrical power supply is lost in at least the first coil component and the transmitter is configured to transmit an alarm signal, depending on said detection. The loss of the power supply in the first coil component may result from an impeded supply from the second coil component, e.g. by the cable rupture which has already been mentioned above or such like, but may also result from a malfunction of the first coil component itself. In this case, the transmitter itself, but also a separate module which is suitable for the purpose, may detect the loss, e.g a voltage meter which determines that a supply voltage for the first coil component, from the second coil component, drops below a threshold value. The transmitter may then transmit an alarm signal, such as an SMS to an operating person, in order to assess the malfunction. It may also be possible to automatically activate the energy store, so that energy is still available for a period of time.

Figure 2:
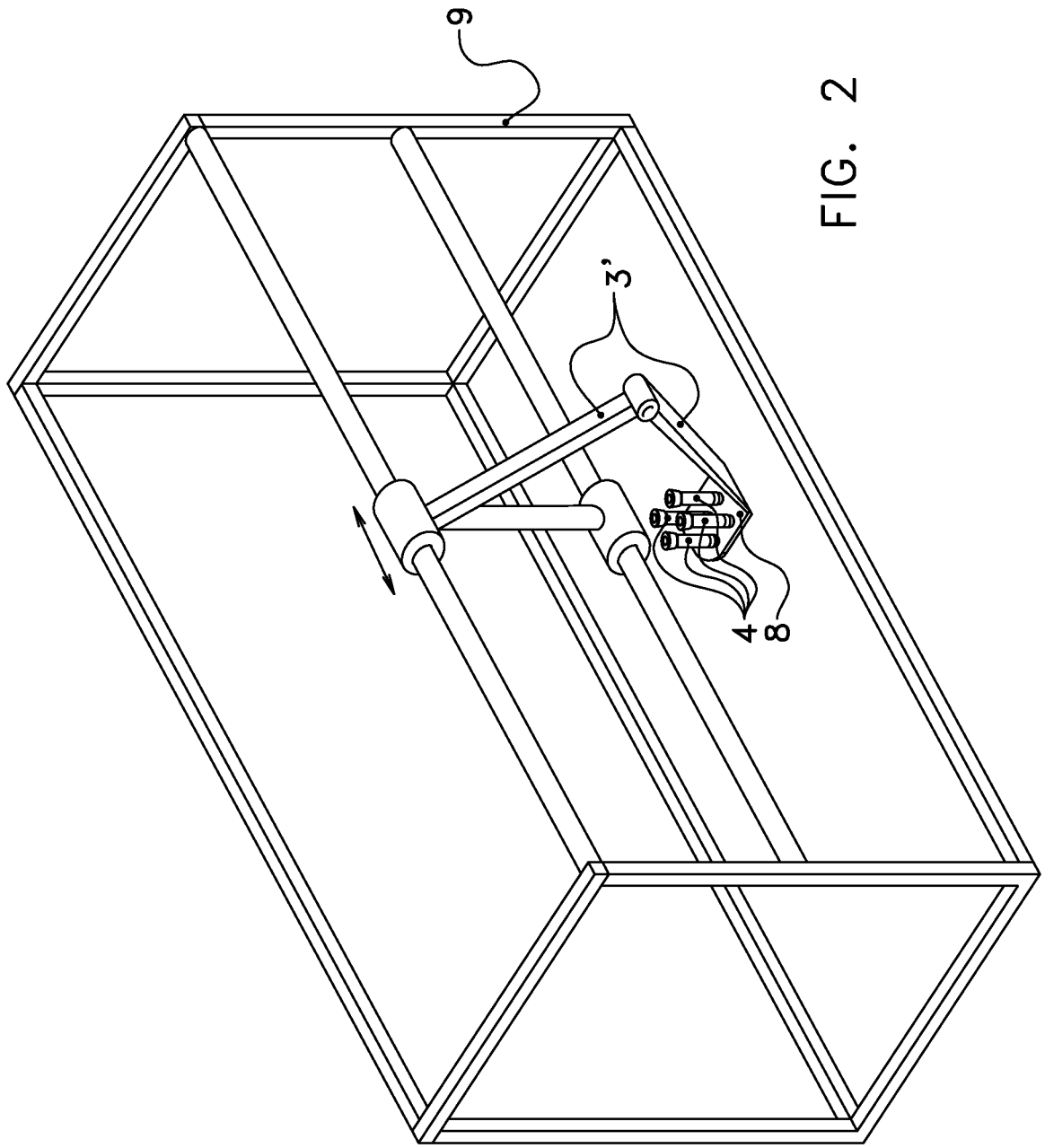
Figure 3:
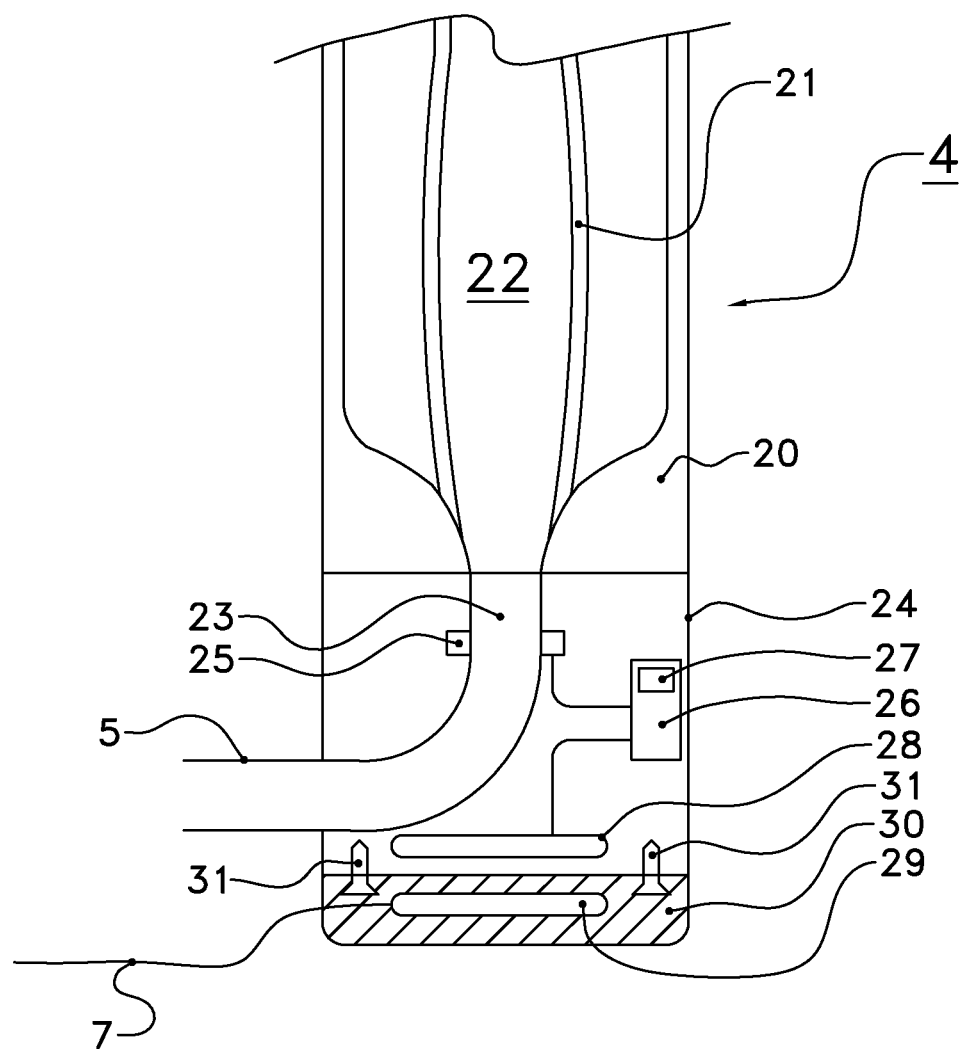

The invention will now be explained in more detail with reference to the drawing, in which:

FIG. 1 shows a diagrammatic side view of a milking system according to the invention, FIG. 2 diagrammatically shows a perspective view of a detail of another embodiment of the milking system according to the invention, and FIG. 3 shows a diagrammatic cross section of another detail of a milking system according to the invention.

FIG. 1 shows a highly diagrammatic side view of a milking system according to the invention. The milking system is denoted overall by reference numeral 1 and comprises a robot 2 with a robot arm 3 and a milking cup 4. The milking cup 4 is connected to a milk hose 5 of discharging milk, and comprises a diagrammatically shown electronic component 6 which is connected to a power cable 7.

Reference numeral 10 denotes a dairy animal having an udder 11 with teats 12.

The illustrated milking robot has a robot arm 3 which grabs the milking cups 4 individually and attaches them to a teat 12 of the dairy animal 10. The components which are additionally required in this case, such as a teat-detecting device, are not relevant to the invention and are not shown further here.

The milk hose 5 may also be coupled to a vacuum hose. The electronic component which is denoted overall by reference numeral 6 inter alia comprises a power supply which is connected to a source of electrical energy, such as the mains, via a power cable 7.

FIG. 2 shows another embodiment of a robot arm 3'. This robot arm 3' is movable/displaceable with respect to a milking stall 9 and at its end comprises a milking cup carrier 8 having four detachable milking cups 4. After the milking operation, the milking cup may be retracted onto the robot arm by means of a retracting means (not shown), such as a string which is attached to the milking cup. To this end, the robot arm furthermore comprises milking cup carriers (not shown).

FIG. 3 shows a diagrammatic cross section of a part of the milking system according to the invention. In particular, FIG. 3 shows a (partial) cross section of a milking cup 4. This milking cup 4 comprises a cup casing 20 and a lining 21 enclosing a teat space 22. The latter runs out into a milk discharge 23 in the first housing part 24. Reference numeral 25 denotes a sensor, reference numeral 26 a control unit, reference numeral 27 an optional battery and reference numeral 28 a first coil.

A second coil 29 is situated in a second housing part 30 which is attached to the first housing part by means of screws 31.

In principle, the first housing part 24 is fixedly connected to the other components of the milking cup 4. Incidentally, in some embodiments, the lining 21 may be replaced by unscrewing the cup casing 20 from the first housing part 24, together with the lining 21. However, the milk discharge 23 remains attached to the milk hose 5.

The power cable 7 is shown here as a separate cable. However, it is also possible to accommodate the power cable 7 in a recess running along the outer side of the milk hose 5 or, if desired, a pulsating hose (not shown) or combination hose (not shown). In this way, the power cable 7 is protected more efficiently against dirt and the like. It is even possible to accommodate the power cable 7 in a separate duct in the milk hose 5, the pulsating hose (not shown) or combination hose (not shown). Effectively, such a duct is a fully enclosed space. This duct does not run parallel to the main pipe 5 up to the connection to the cup casing 20, but ends before, with an outlet for the power cable 7 which is then connected to the second coil 29.

In specific milking systems, such as the Lely Astronaut® system, the milking cup is connected to a retracting means different from a milk hose, such as a cable, in order to pull the milking cup back to a starting position after the milking operation, such as onto a robot arm in the case of the Astronaut®. With such a system, it is advantageous if the retracting means is configured as the power cable, so that two functions can be combined and a saving on material can be achieved.

In this case, the illustrated sensor 25 is a milk flow meter, which measures a milk flow rate in the milk hose 5. This may be any kind of milk flow meter, such as a magnetohydrodynamic milk flow meter. Effectively, the sensor may even be any kind of sensor which measures any milk-related parameter, such as a temperature of the milk, a conductivity of the milk, an optical transmission of the milk etc. The reader is referred to the prior art for details regarding suitable sensors.

The sensor 25 is connected to the control unit 26 in order to pass on the sensor signal and to receive electrical energy. This electrical energy enters the milking cup via the power cable 7 and the second coil 29, which is inductively coupled to the first coil 28 which is in turn connected to the control unit 26. The principle of using an inductive coupling with power supplies is generally known, for example in toothbrushes which are charged thus. Reference numeral 27 denotes an optional battery which may be used as an emergency power supply, if desired.

The signal of the sensor 25 which is sent to the control unit 26 may be passed on to an external control unit of the milking system by the control unit 26 placing, for example, a high-frequency signal or at least a signal of a different frequency on the power supply signal. A technique which may be used for this purpose is known as Power Line Communication. The specific details thereof are also deemed to be known in the prior art, thus making a more detailed explanation superfluous. Alternative ways of transmitting the signal of the sensor 25 or a resultant thereof processed by the control unit 26 to an external destination are, for example, a transmitter, such as a Bluetooth transmitter, optical data communication, such as via an LED, etc.

In the illustrated exemplary embodiment, the first and second housing part are fixedly connected to each other by means of screws 31. By unscrewing the screws 31, the housing parts can be detached from each other. This may be advantageous if, for example, the power cable 7 has been damaged by a kick from a cow, corrosion or other wear. Then, the generally much more complicated, more sensitive and more expensive first housing part 24 comprising the sensor 25 and the control unit 26 does not have to be replaced at the same time, resulting in a saving in raw materials and time.

It is possible to cast the second coil 29 in the second housing part 30, so that no external connector is required between the power cable 7 and the second coil 29. In this way, this part of the power supply is protected still more efficiently against corrosion by water, ambient air etc. Casting in may be achieved in a manner which is known per se using synthetic resin etc.

The first and second coil 28, 29 are each arranged at the bottom of the milking cup 4. However, it is also possible to arrange these at another location on the milking cup, such as on the side. The latter offers the advantage that the total height of the milking cup can be smaller and that the second housing part is easier to remove and replace. On the other hand, a position at the bottom of the milking cup has the advantage, for example, that it is less in the way of the other milking cups on the robot arm.

The first and second coil are both drawn as being flat, with the planes running parallel to each other at a distance. Alternatively, it is also possible to design the first and second coil as a cylinder, in which case the cross section of the coils 28 and 29 differs in such a way that the second 29 coil can be arranged in or around the first coil 28.

The first housing part 24 may also be a substantially water-tight and air-tight housing, as a result of which the first coil 28 is also protected from corroding and other detrimental effects.

The significant advantage of the present invention is that one or more sensors 25 can be used in or near the milking cup 4 without there being a galvanic connection between the milking cup and an external power supply, thus preventing annoying stray currents from causing a painful sensation with the dairy animal. In addition, the power supply is guaranteed by the fact that it is substantially protected against interfering outside effects, while in case of the most common damage, namely of the power cable 7, the respective part of the power supply can easily be replaced together with the second coil in the second housing part.

The illustrated embodiments are by no means intended as limiting the invention, but only to illustrate the invention. The scope of protection of the present invention is determined by the attached claims.

The invention claimed is:

1. A milking system for milking a dairy animal, comprising:
   a milking cup to be attached to a teat of the dairy animal and milking milk from the dairy animal, and
   an electronic component with a sensor which is arranged in or on the milking cup for measuring a value of a variable related to the milking, a transmitter for transmitting the measured values, and a power supply for supplying the sensor and/or the transmitter with electrical energy,
   wherein the power supply comprises an inductive power supply with a first coil component and a second coil component,
   wherein the first coil component and the electronic component are electrically connected to each other in a direct and fixed manner, and wherein the second coil component is electrically directly connectable to an external source of electrical energy,
   wherein the milking system furthermore comprises a fastening means which holds the first coil component and the second coil component together such that the first coil component and the second coil component remain inductively connected, even during milking.

2. The milking system as claimed in claim 1, wherein the fastening means is detachable by a user in order to replace the second coil component or the milking cup.

3. The milking system as claimed in claim 1, further comprising an external source of electrical energy which is electrically connected to the second coil component by an external current conductor.

4. The milking system as claimed in claim 3, wherein the second coil component comprises a housing containing a coil and a connection between the coil and the external current conductor which connection is integrally molded on or cast in.

5. The milking system as claimed in claim 3, wherein the transmitter is configured to transmit the measured value via the first coil component, the second coil component and the external current conductor.

6. The milking system as claimed in claim 5, wherein the transmitter comprises a modulator in order to provide a voltage signal on the first coil component, which voltage signal is modulated as a function of the measured value.

7. The milking system as claimed in claim 3, wherein the external current conductor is an electric wire.

8. The milking system as claimed in claim 1, wherein the transmitter comprises a wireless transmitter.

9. The milking system as claimed in claim 8, wherein the wireless transmitter comprises a transmitter from the group selected from a Near-Field Communication device and an optical transmitter.

10. The milking system as claimed in claim 8, wherein the wireless transmitter comprises an infrared transmitter.

11. The milking system as claimed in claim 1, wherein the milking cup comprises an energy store which is configured to be charged by means of the power supply.

12. The milking system as claimed in claim 11, wherein furthermore the power supply is configured to detect if the electrical power supply is lost in at least the first coil component and the transmitter is configured to transmit an alarm signal, depending on said detection.

13. The milking system as claimed in claim 1, wherein the milking system is a milking robot.

* * * * *